United States Patent [19]
Johnston

[11] 3,824,630
[45] July 23, 1974

[54] PROSTHETIC JOINT FOR TOTAL KNEE REPLACEMENT

[75] Inventor: L. Lyle Johnston, Syracuse, Ind.

[73] Assignee: Zimmer Manufacturing Co., Warsaw, Ind.

[22] Filed: June 23, 1972

[21] Appl. No.: 265,577

[52] U.S. Cl.............................. 3/1, 3/22, 128/92 C
[51] Int. Cl. .............................................. A61f 1/24
[58] Field of Search........................... 3/1, 2, 22–29; 128/92 C, 92 R

[56] References Cited
UNITED STATES PATENTS

| | | | |
|---|---|---|---|
| 2,046,069 | 6/1936 | Greissinger | 3/29 |
| 2,208,275 | 7/1940 | McCann | 3/22 X |
| 3,696,446 | 10/1972 | Bousquet et al. | 3/1 |
| 3,715,763 | 2/1973 | Link | 3/1 |
| 3,765,033 | 10/1973 | Goldberg et al. | 3/1 |

FOREIGN PATENTS OR APPLICATIONS

| | | | |
|---|---|---|---|
| 163,476 | 6/1958 | Sweden | 128/92 C |
| 1,005,383 | 12/1951 | France | 3/22 |
| 1,047,640 | 7/1953 | France | 128/92 C |
| 489,216 | 1/1930 | Germany | 3/22 |

OTHER PUBLICATIONS

J. W. Edwards, "Artificial Limbs," Orthopaedic Appliances Atlas, Ann Arbor, Mich., Vol. 2, 1960, page 188, Figure 5.78e relied upon.

Primary Examiner—Richard A. Gaudet
Assistant Examiner—Ronald L. Frinks
Attorney, Agent, or Firm—Olson, Trexler, Wolters, Bushnell & Fosse, Ltd.

[57] ABSTRACT

The embodiment disclosed herein illustrates a joint prosthesis for total knee replacement. The joint prosthesis includes a first prosthetic member including a stem member adapted for insertion into a first skeleton element and further including a first joint-forming member at one end of the stem member to provide a convexly shaped articulation surface. A second prosthetic member includes a stem for insertion into a second skelton element disposed adjacent the first skeleton element and is also provided with a second joint-forming member at the other end thereof to provide a concavely shaped articulation surface. The convexly shaped articulation surface cooperates with the concavely shaped articulation surface by means of a connecting link having a ball joint at one end and a pivot joint at the other end. The movement of the prosthesis closely approximates that of the actual knee joint movement.

8 Claims, 27 Drawing Figures

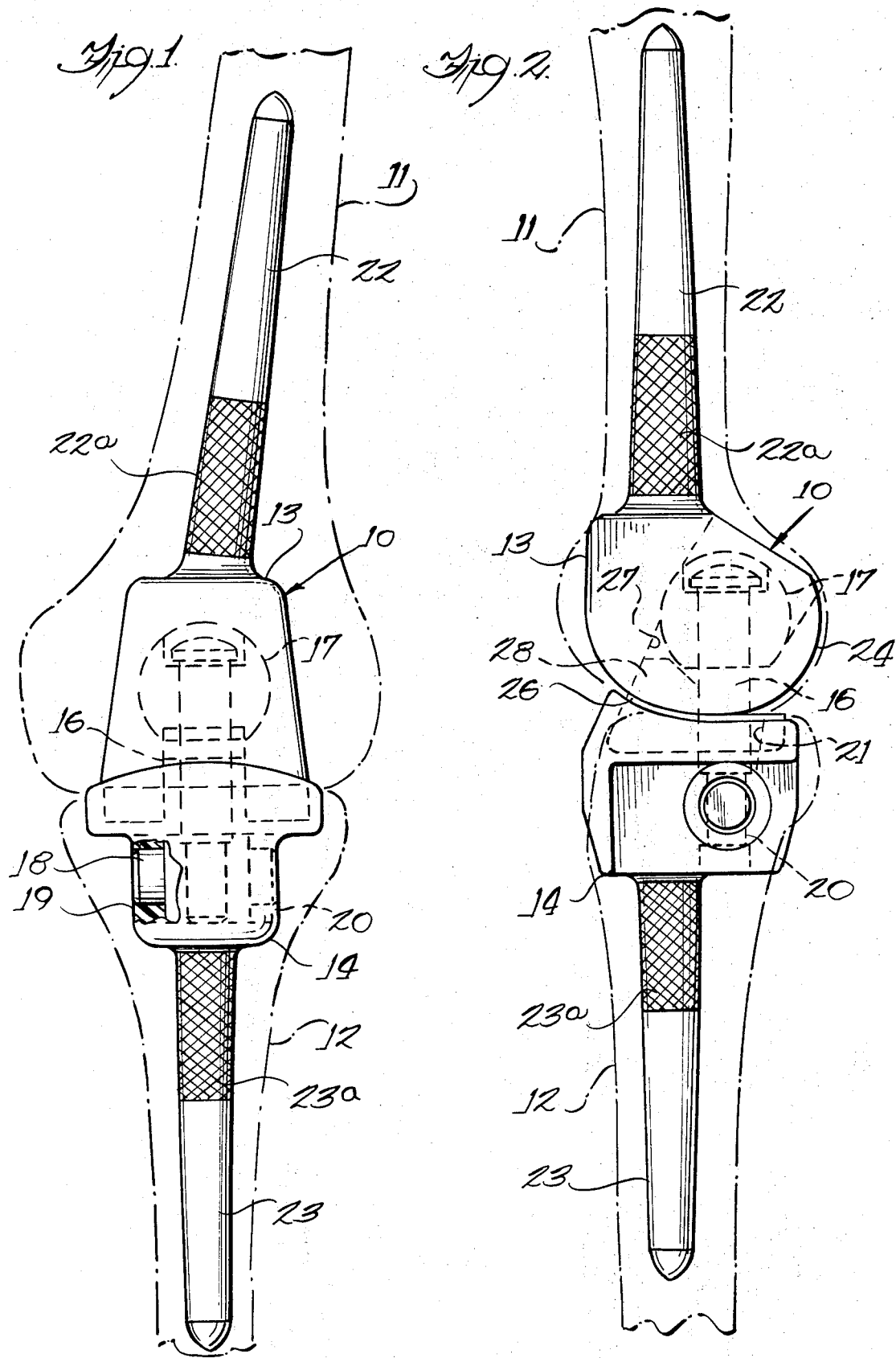

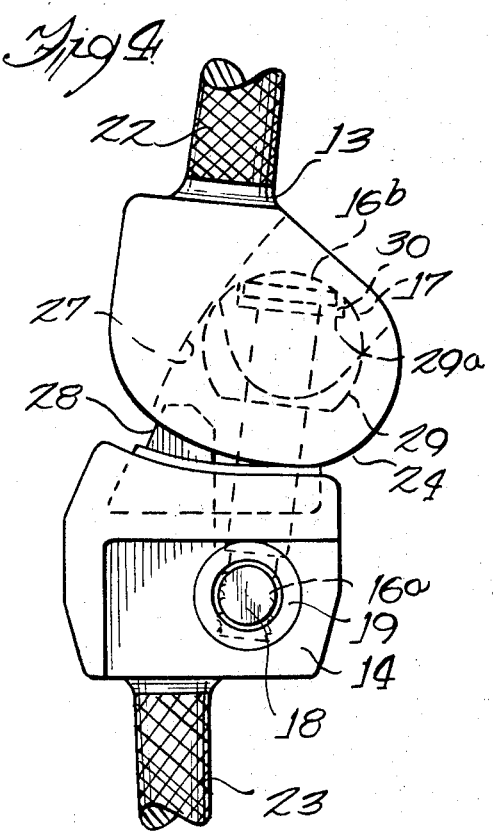
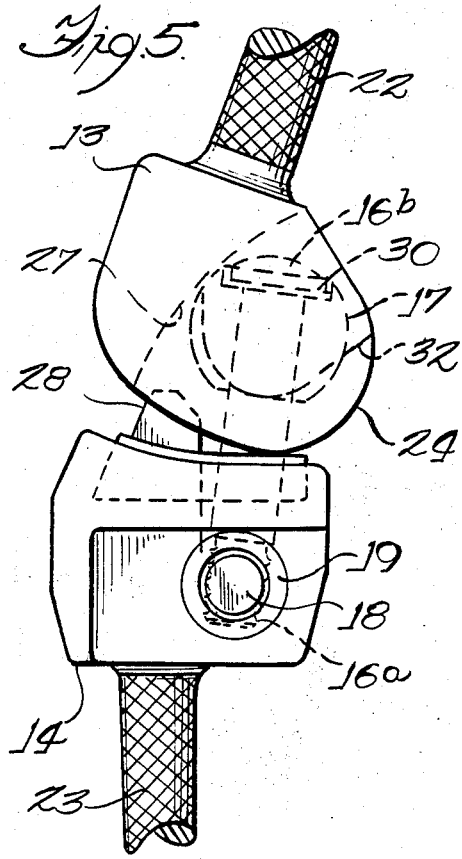
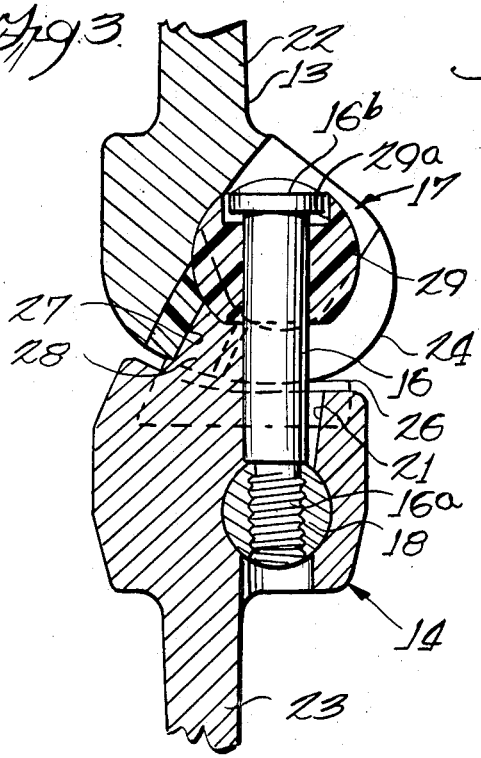
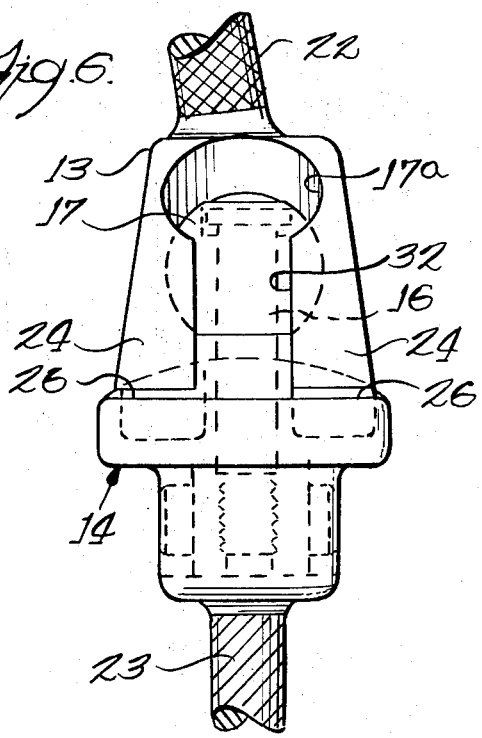

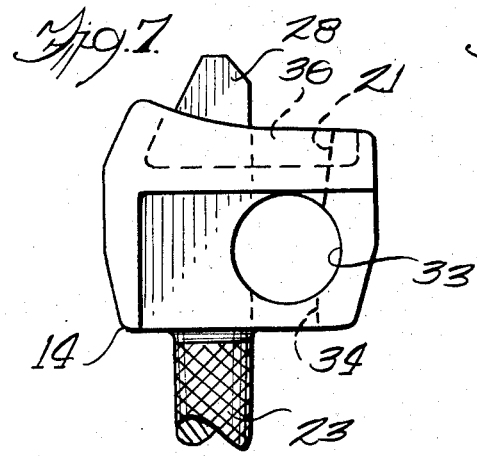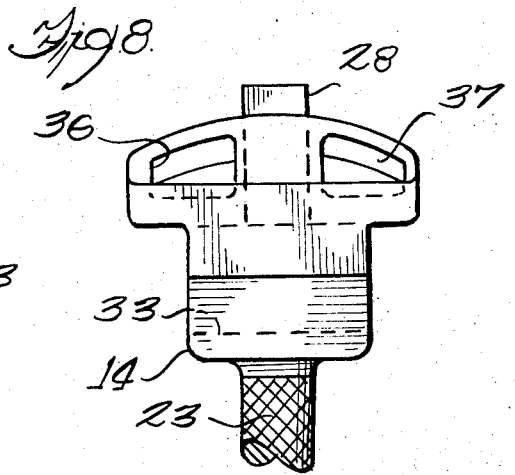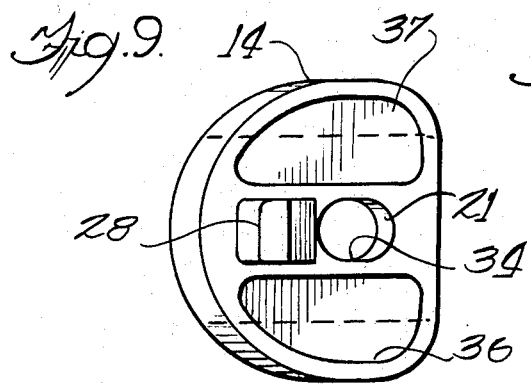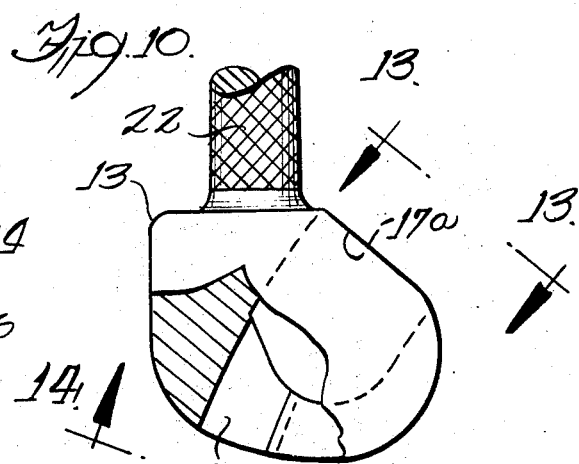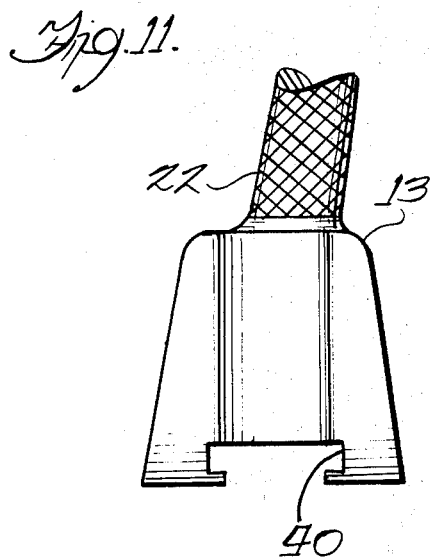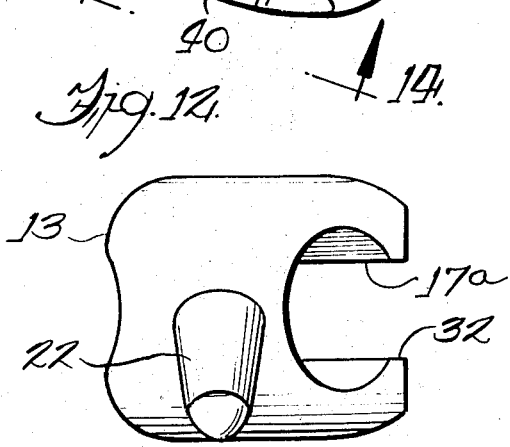

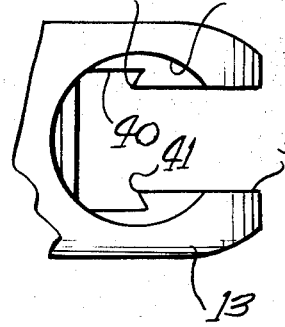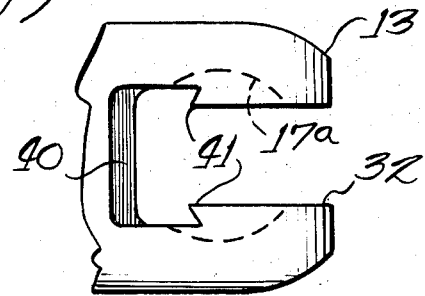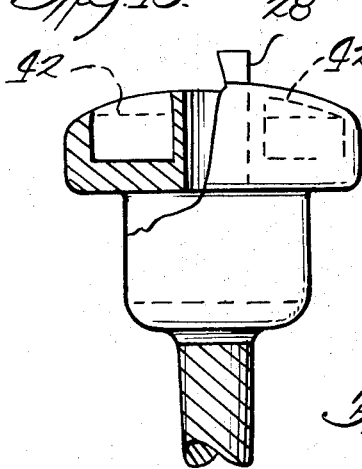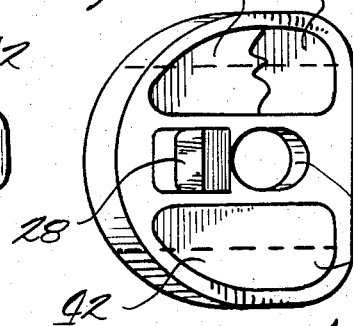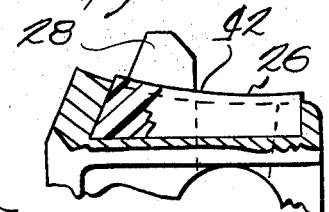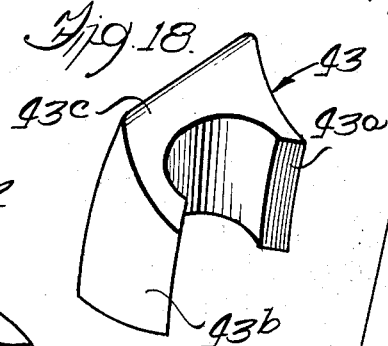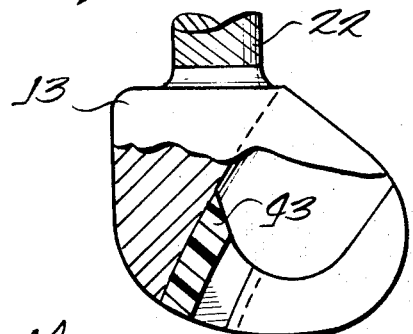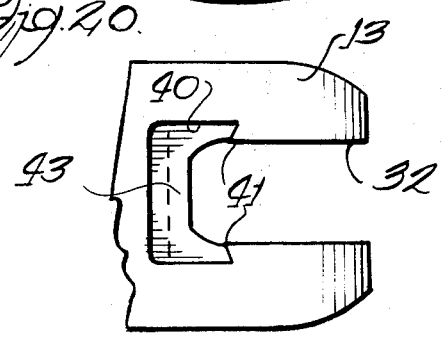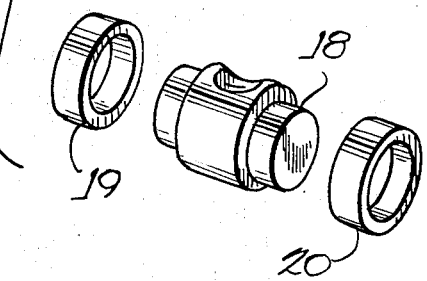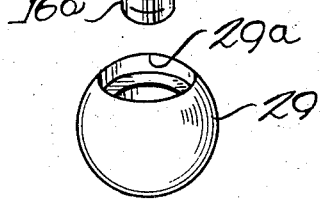

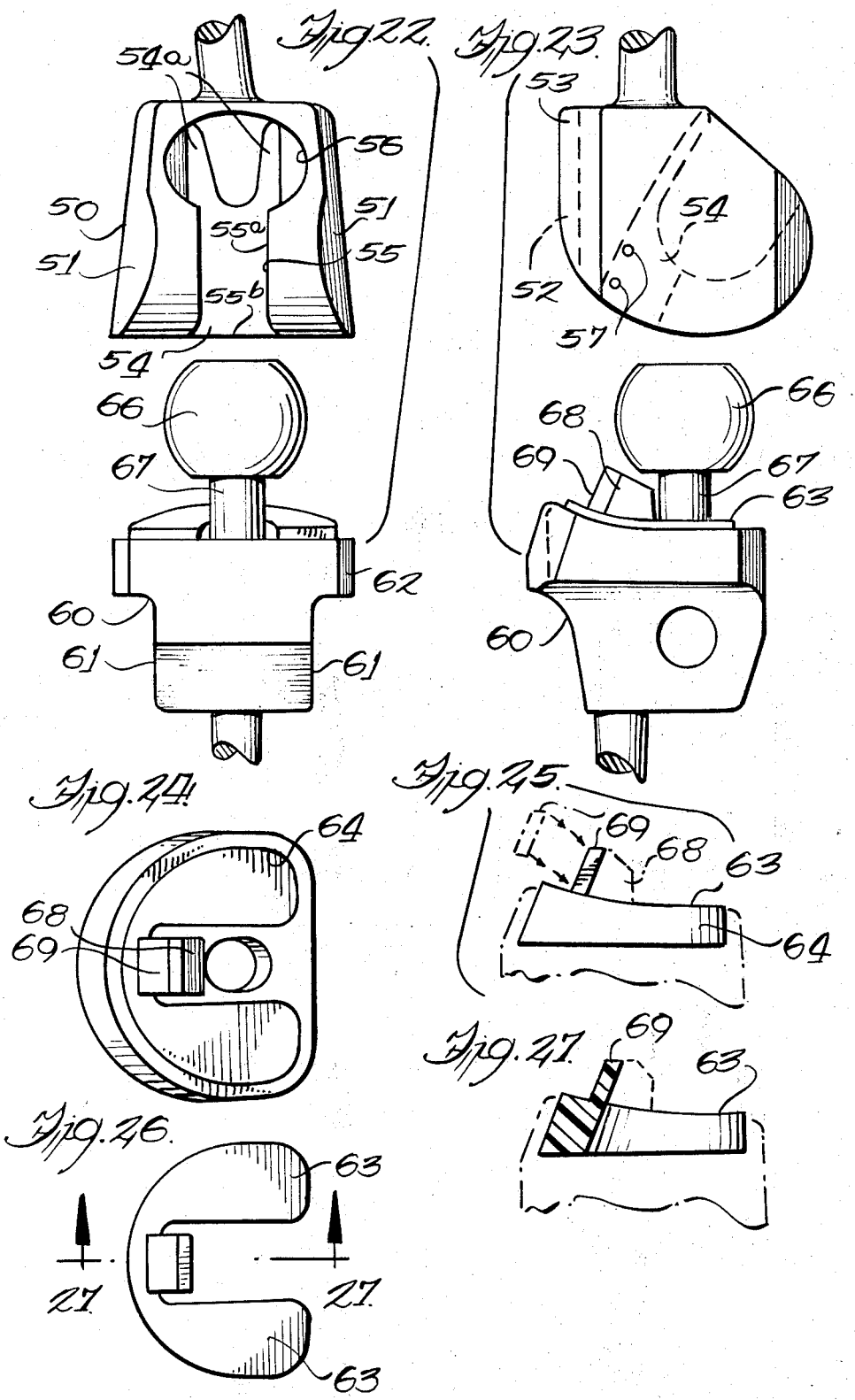

PROSTHETIC JOINT FOR TOTAL KNEE REPLACEMENT

BACKGROUND OF THE INVENTION

This invention relates to prosthesis joints, and more particularly to prosthesis joint elements for total knee replacement. The prosthesis joint is implanted in the body of a subject human or animal. Heretofore, prosthesis joints have been used to replace defective natural joints in humans and animals when such joints have become diseased or injured through accidents. However, prior art prostheses have been found impractical for knee implantation because they do not provide for the complexity of motions involved when flexing the tibia relative to the femur. Some prior prosthesis joints tend to become inoperative because of wear or because of inability to perform the complicated movements necessary for lifelike movement. While suitable prosthetic members have been devised utilizing a simple ball joint connection for the motion, this type of action greatly limits the use of the leg receiving the same because of the movable pivot point type of motion required for proper knee bending action.

SUMMARY OF THE INVENTION

Accordingly, it is an object of this invention to provide a joint prosthesis for total knee joint replacement which more closely approximates the movement of an actual joint connection of the femur, tibia, and patella.

Briefly, the prosthesis unit of this invention includes a first prosthetic member which forms the upper end of the tibia and is insertable into the proximal end portion of the tibia after preparing the tibia to receive the stem of the member. A second prosthetic member forms the socket end of the femur and includes a stem portion insertable therein after similar preparation. The two prosthetic members are designed so as to be readily connected after each element is inserted into the respective skeleton elements to minimize the need of stretching or severing tissue or tendons for making the connection. The prosthetic element at the end of the femur has an involute shaped surface, sometimes referred to as the convex surface, engaging a concave surface and provides slidable rotatable contact therewith when bending the knee. Holding the knee prosthetic elements together is a ball stud pivotal at one end about a longitudinal axis and rotatably pivotal at the other end by means of a ball and socket. This allows partial pivotal and slidable movement between the two elements to closely proximate the movement of an actual knee connection.

Many other objects, features and advantages of this invention will be more fully realized and understood from the following detailed description when taken in conjunction with the accompnaying drawings wherein like reference numerals throughout the various views of the drawings are intended to designate similar elements or components.

BRIEF DESCRIPTION OF THE DRAWINGS

FIG. 1 is a frontal view of a prosthesis joint constructed in accordance with the principles of this invention;

FIG. 2 is a side view of the prosthesis joint of FIG. 1;

FIG. 3 is a fragmentary sectional view showing the operative components of the prosthesis joint of this invention;

FIG. 4 illustrates initial movement of the prosthesis joint of FIG. 3;

FIG. 5 illustrates further movement of the prosthesis joint of FIG. 3, this further movement being about a different pivot point than that shown in FIG. 4;

FIG. 6 illustrates an end view of the prosthesis joints of FIGS. 4 and 5;

FIG. 7 is a fragmentary elevational view of the prosthetic member which forms the medial condyle and the lateral condyle of the tibia to which it is fastened;

FIG. 8 is an end view of the prosthetic member of FIG. 7;

FIG. 9 is a top view of the prosthetic member of FIG. 7;

FIG. 10 is a fragmentary partial sectional view of the prosthetic member which forms the medial condyle and lateral condyle of the femur member to which it is fastened;

FIG. 11 is a front view of the prosthetic member of FIG. 10;

FIG. 12 is a top view of the prosthetic member of FIG. 10;

FIG. 13 is a fragmentary view taken along line 13—13 of FIG. 10 showing the recess which receives the frictionless plastic insert for smooth socket connection;

FIG. 14 is taken along line 14—14 of FIG. 10;

FIG. 15 is a front view of the prosthetic member of FIGS. 7 and 8 with portions thereof broken away to illustrate the cavities which receive the frictionless plastic inserts which form the slidable moving contact surfaces for the knee joint;

FIG. 16 is a top view of the prosthetic member forming the tibia end;

FIG. 17 is a fragmentary partially sectional view showing the plastic insert in the prosthetic member of FIG. 16;

FIG. 18 is a perspective view of a plastic insert to be inserted into the prosthetic member illustrated in FIGS. 10-14;

FIG. 19 illustrates the insert of FIG. 18 in position in the prosthetic member of FIGS. 10-14;

FIG. 20 is a bottom view of the prosthetic member of FIG. 19;

FIG. 21 illustrates the ball stud and pivot connection which link the prosthetic members holding the tibia and femur ends together;

FIG. 22 is a rear view of the prosthetic joint constructed in accordance with this invention with the prosthetic elements separated a short distance for clarity;

FIG. 23 is a side view of the arrangement shown in FIG. 22;

FIG. 24 is a top view of an alternate form of prosthetic member constructed in accordance with this invention;

FIG. 25 illustrates a two piece insertable plastic member forming the friction surface and the stop element for the prosthetic element of this invention;

FIG. 26 illustrates a one piece unit replacing the two piece construction of FIGS. 24 and 25; and FIG. 27 is a sectional view taken along line 27—27 of FIG. 26.

DETAILED DESCRIPTION OF THE ILLUSTRATED EMBODIMENTS

Referring now to FIGS. 1 and 2 there is seen a front and side view of a joint prosthesis constructed in accordance with the principles of this invention and designated generally by reference numeral 10. The joint prosthesis 10 is shown in relation to its connection to the proximal end portions 11 and 12 of the associated femur and tibia, respectively. The prosthesis joint 10 is formed of a first prosthetic member 13 insertable into the femur and a second prosthetic member 14 insertable into the tibia. The proximal ends of the femur and tibia are prepared by cutting and/or reaming the end portions so that the prosthetic members 13 and 14 can be inserted in such a manner to function similar to the pivotal sliding action of the medial condyle and lateral condyle of the actual bone elements being replaced. The prosthetic member 13 is joined with the prosthetic member 14 by link means formed by a pivotal ball stud 16 and ball and socket 17. A slot 32 is formed in the prosthetic member 13 to receive the stud and ball after the prosthetic elements have been fastened to their respective femur and tibia ends. The ball stud 16 is pivotally secured to the prosthetic member 14 by means of a transverse pin 18 journalled by a pair of bushings 19 and 20. The ball stud 16 pivots about the pin 18 through a limited arcuate movement within a channel 21. Further movement of the prosthetic member 13 is by rotation about the ball and socket connection 17 which provides a continuous rotational sliding action between cooperating concave and convex articulation surfaces.

The prosthetic member 13 includes a stem element 22 which has a rough surface portion 22a extending upwardly from the main body or head of the member for about 1 to 2 inches. This rough surface of the stem 22 provides more secure connection between the prosthetic element and the skeleton element receiving the same. Similarly, the prosthetic member 14 has a depending stem portion 23 and a roughened portion 23a which serves the same purpose.

During bending of the knee joint the prosthetic member 13 has an involute shaped bearing surface 24 conforming substantially to the involute shaped surface of the femur end of a natural joint. The bearing surface 24 engages a plateau element 26, preferably of friction resistant plastic material such as polyethylene, or the like. These two elements then rotate about diametrically opposed pivot points on opposite sides of the surface 24, these pivot points being represented by the pin 18 and the ball and socket 17. The prosthetic joint 10 has an overcenter stop action between the femur and tibia elements 13 and 14 which provides a locked condition substantially similar to that of a natural knee joint when the inner wall 27 abuts with an upstanding stop element 28. This limits forward bending or hyperextension of the prosthesis joint. When replacing damaged or diseased knee joints with the prosthesis joint of this invention it may be desirable to remove the patella in those instances where it is no longer functional.

Referring now to FIG. 3 a detailed sectional view shows the connection between the prosthetic members 13 and 14. Here it can be seen that the ball stud 16 has a threaded end 16a which engages a threaded opening in the pin 18. The ball stud extends upwardly and receives a ball 29 preferably of high impact plastic material having self-lubricating or antifriction properties such as polyethylene or the like. The ball 29 is held in position by a flared end 16b of the ball stud 16 and includes an undercut portion 29a so that some axial movement of the ball relative to the ball stud is possible during flexure of the knee joint. That is, initially the ball stud 16 moves rearwardly a limited amount so that it engages the inner wall 21 of the prosthetic member 14. Further pivotal movement between the prosthetic elements 13 and 14 is accomplished by pivotal rotation of the member 13 about the axis point of the ball and socket at that particular location at which the involute shaped surface 24 engages the plateau 26. For example, FIG. 4 shows initial rotation of the prosthetic element 13 about the axis of the ball and socket 17. In this instance a space 30 is shown between the flared end 16b and the bottom of the recess 29a. However, further rotation of the prosthetic member 13 causes the distance between the center point of the ball and the involute shaped surface 24 to change. This is best illustrated in FIG. 5 which now shows the space 30 as being substantially eliminated as indicated by reference numeral 31. The limit of rearward flexure of the prosthetic knee joint is controlled by muscular and tendon action in a similar manner as the natural knee joint.

Referring now to FIG. 6 the rear view of the joint prosthesis 10 is shown. Here the slot 32 is provided in the arcuate surface 24 and extends from the opening forming the socket 17a of the ball and socket 17 to the front wall 27 against which the stop member 28 abuts. The slot 32 allows the ball and ball stud to be inserted into the prosthetic member 13 after each of the prosthetic members have been fastened to the respective bone ends. As seen in FIG. 5 the stop member 28 extends upwardly so as to be at all times disposed within the slot 32. In this manner pivotal transverse movement between the femur and tibia is limited by the space or clearance between the sides of the stop member and the sidewalls forming the slot 32. This clearance can be varied from point to point along the slot to provide relative rotation between the prosthetic members 13 and 14 at certain desired points. By providing pivot points on opposite sides of slot 32, and by allowing selective transverse movement by the space between the stop 28 and the sides of the slot 32, the joint prosthesis of this invention closely approximates the movements of a natural knee joint.

For a better understanding of the details of construction of the prosthetic joint structure 10, reference is now made to the following drawings showing details and modifications which can be incorporated without departing from the novel concepts of this invention. FIGS. 7, 8 and 9 illustrate the upper end of the prosthetic member 14. A bore 33 is formed laterally of the head portion to receive the pin 18 and the bushings 19 and 20. A second bore 34 is provided at the bottom of the head portion and extends into the bore 33. The back wall portion 21 within the interior of the prosthetic member 14 is angularly disposed from a vertical axis to provide a slanted stop surface for the ball stud 16 which rests against the wall at its limit of travel. A pair of recesses 36 and 37 are provided for receiving the plateau elements 26 which are retained therein either by means of a pressure fit adhesive or fastening screws or the like. The recesses 36 and 37 are disposed on opposite sides of the upstanding stop member 28 and the bore 34. However, it will be shown that other configurations of the frictionless plateau surface can be incorporated.

Referring now to FIGS. 10, 11, 12, 13 and 14 the details of configuration of the prosthetic member 13 are shown. The prosthetic member 13 has a recess 40 formed therein and extending from the endmost portion of the slot 32 diagonally through the head of the prosthetic member into the socket 17a formed therein. This recess is adapted to receive an insert element which is made of lubricant-like or antifriction plastic material such as polyethylene or the like. The endmost portion of the slot 32 is then formed by the contoured side walls of the insert placed in the recess 40. It will be noted in FIGS. 11 and 12 that the stem portion 22 extending from the head of the prosthetic member 13 is angularly disposed, this angle being substantially in conformity with the angular disposition of the natural structure of the skeleton. The recess 40 has inwardly turned edge portions 41 terminating at the sidewalls of the slot 32. These edge portions confine the insert to be placed therein.

The space between the sidewalls of the slot 32 and the stop member 28 is such that the femoral portion of the prosthesis is permitted to externally rotate about 20° relative to the tibial portion of the prosthesis. The femoral and tibial portions of the prosthesis are preferably one piece cast constructions of metal suitable for implantation into the human body, such metal being, for example, chrome cobalt alloy, stainless steel, or titanium alloy. By providing the ball stud 16 with a pivot pin 18 and by providing the recess 29a in the ball 29 the ball 29 is allowed to move in two directions substantially simultaneously during flexure of the knee joint. The ball 29 together with the other plastic insertable elements are formed of friction resistant material such as polyethylene or the like, and the ball then is slidable downward on the ball stud as shown in FIG. 3.

FIGS. 15, 16 and 17 illustrate the prosthetic member 14 having plastic insert members positioned in the recesses 36 and 37 to form the smooth plateau surface 26. The plateau surface 26 is the exposed upper surface of a pair of inserts 42 held in place by suitable means such as a press fit or by screw means, not shown. The inserts 42 form a concavely shaped articulation surface which cooperates with the involute shaped articulation surface 24 of the prosthetic member 13 in such a manner so as to perform the same kind of flexure movement as the medial condyle and the lateral condyle of the natural knee joint.

FIG. 18 illustrates the configuration of the insert to be placed into the recess 40 of FIGS. 10–14. The insert is here designated by reference numeral 43 and includes angularly fashioned end portions 43a and 43b and an arcuately shaped concave surface 43c which forms part of the socket 17a of the ball and socket structure 17. FIGS. 19 and 20 illustrate the prosthetic member 13 with the insert 43 in position. This insert may be held in place by a pin extending laterally through the head portion of the prosthetic member 13 or by any other suitable means.

FIG. 21 illustrates the ball stud 16, ball 29, pivot pin 18 and bushings 19 and 20. While the ball 29 and bushings 19 and 20 are preferably made of a friction resistant material such as polyethylene similar to that of the inserts 42 and 43, they can be made of other materials if desired.

FIGS. 22 and 23 have the prosthetic members separated a short distance, and illustrate a modified form of this invention wherein the polyethylene inserts are altered somewhat for reducing the number of components in the joint prosthesis. Also, the shape of the head portions of each of the prosthetic members is somewhat altered to reduce the total mass of the joint. For example, the prosthetic member 50 corresponds to the prosthetic joint member 30 to be inserted into the femur and has substantially rounded sidewalls 51 and a rounded front wall 52. A groove 53 may be formed in the front wall 52 which receives the patella tendon after the patella is removed. The groove 53 is also sufficiently large to allow passage of the patella, should it be present. A plastic insert 54 fits into the socket 56 which receives the ball and has upwardly extended portions 54a which are formed after machining or boring the socket. That is, the insert 54 is placed in a groove in prosthetic member 50 and subsequently the final machining or drilling of socket 56 is accomplished. The insert 54 is held in place by a pair of pins 57, this being shown more clearly in the embodiment of FIG. 23.

The prosthetic member 50 has a slot 55 formed therein which has the spaced apart wall portions having one dimension in the region 55a and another dimension in the region 55b. Preferably the region 55a is more closely spaced together than the region 55b so that the ball shaft 67 is closely confined in the region 55a to prevent any transverse movement of the prosthetic members relative to one another when the knee is in a substantially bent or flexed condition. For example, the slot 55 of the femoral prosthetic joint 50 is fashioned so that when the knee is bent between 20° and 120° from a vertical condition there will be no relative rotation between the femoral component and the tibial component. However, when the knee is straightened or extended between 20° and 0°, rotational movement will be permitted between the femoral and tibial components. This relative rotation can be within a range of approximately +15° external rotation and 0° internal rotation between femoral and tibial components while in a standing position. This will provide a "screwing home" action or locking of the two components so as to allow the patient to stand upright without the continuous effort or muscle tension. A few degrees of hyperextension may be desired in the design of the prosthetic members in order to make the standing position easier for the patient.

The prosthetic member 60 corresponds substantially to that of the prosthetic member 14 for insertion into the tibia. The side portions 61 of the head of the prosthetic member are substantially reduced in thickness as well as the plateau receiving portion 62. This reduces the total mass of the knee joint. Also, the plateau forming member 63 is C-shaped in configuration and fits into a correspondingly fashioned C-shaped recess 64 shown in FIG. 24. A ball 66 extends upwardly from a ball stud 67 in substantially the same manner as mentioned hereinabove. An upstanding stop element 68 has a plastic face member 69 secured thereto, this being either an integral part of the plateau forming member 63 or a separate piece as illustrated in FIG. 25. FIGS. 26 and 27 illustrate a unitary construction of the plateau forming member 63 and the insert portion 69 of the stop 68.

With regard to FIGS. 1 and 2, the rough surface portions 22a and 23a can be formed in any suitable manner such as by knurling or sand blasting or the like.

While rather detailed descriptions of the various alternate forms of the invention are set forth herein, it will be understood that variations and modifications may be effected without departing from the spirit and scope of the novel concepts of this invention as set forth in the following claims.

The invention is claimed as follows:

1. A joint prosthesis comprising, first prosthetic means for fixation to a first skeleton element and including a convexly shaped articulation surface for location at the distal end of said first skeleton element, second prosthetic means for fixation to a second skeleton element adjacent said first skeleton element and including a concavely shaped articulation surface for location at the proximal end of said second skeleton element, and link means pivotally connected to said first and second prosthetic means to provide slidable and rotational contact between said convexly shaped and said concavely shaped articulation surfaces, said link means being pivotally connected to said first prosthetic means by a ball and socket and pivotally connected to said second prosthetic means by a pin.

2. The joint prosthesis according to claim 1 wherein said link means is arranged to have said first prosthetic means pivot about said pin during a first instance of motion and pivot about said ball and socket during a second instance of motion.

3. The joint prosthesis according to claim 1 wherein said first prosthetic means has a head portion having a pair of spaced apart involute shaped surfaces forming said convexly shaped articulation surface, a slot formed between said pair of spaced apart involute shaped surfaces, a socket communicating with said slot, said second prosthetic means has a head portion including insert elements forming said concavely shaped articulation surface, said insert elements providing spaced apart engagement surfaces in contact with said pair of involute shaped surfaces, said link means being a ball stud pinned to said second prosthetic means for limited pivotal movement and extending into the ball socket of said first prosthetic means through said slot, and a ball secured to said ball stud and positioned within said socket, whereby said first and second prosthetic means move relative to one another by rotational and sliding action between said engagement surfaces and said involute shaped surfaces.

4. The joint prosthesis according to claim 3 wherein said ball on said ball stud is axially movable during movement between said first and second prosthetic means.

5. The joint prosthesis according to claim 3, wherein a stop member extends from said second prosthetic means into said slot formed in said first prosthetic means, said stop member engageable with a front wall of said slot to limit forward bending between said first and second prosthetic means.

6. The joint prosthesis according to claim 1 wherein said first and second prosthetic means each includes stem members extending therefrom to be inserted into the skeleton element receiving the same, and said stem members have rough peripheral surface about said stem members and extending a given distance along said stem members.

7. An appliance for replacement of a disabled human joint comprising: first prosthetic means including a stem member adapted for fixation in a first skeleton element and further including a first joint-forming member at one end of said stem member, said first joint-forming member having a convexly shaped articulation surface; second prosthetic means including a second stem member adapted for fixation in a second skeleton element disposed adjacent said first skeleton element and further including a second joint-forming member at one end of said second prosthetic means, said second joint-forming member having a concavely shaped articulation surface engageable with said convexly shaped articulation surface; link means cooperating to couple said first and second prosthetic means so that said convexly shaped articulation surface and said concavely shaped articulation surface are in slidable rotational contact with one another; and pivot means connecting one end of said link means to at least one of said prosthetic means, said pivot means includes a pin for connecting said link means to said second prosthetic means, and wherein said link means includes a ball stud having one end thereof pivotally connected to said second prosthetic means by said pin and the other end thereof receiving a ball which pivotally engages said first prosthetic means, whereby said first prosthetic means can pivot relative to said pin during a first instance of motion and said first prosthetic means can pivot about said ball during a second instance of motion.

8. The appliance for replacement of a disabled human joint according to claim 7 further including stop means extending upwardly from said second prosthetic means and engageable with an opening in said first prosthetic means, said opening also forming a slot to receive said ball stud which has one end connected to said pin.

* * * * *